Sept. 19, 1950        H. L. GOOCH        2,523,014
HYDRAULIC MOWER

Filed July 15, 1947                            6 Sheets-Sheet 1

Inventor
HERBERT L. GOOCH
by
Attys.

Sept. 19, 1950 H. L. GOOCH 2,523,014
HYDRAULIC MOWER
Filed July 15, 1947 6 Sheets-Sheet 6

Inventor
HERBERT L. GOOCH
By The firm of Charles H. Hill
Attys.

Patented Sept. 19, 1950

2,523,014

UNITED STATES PATENT OFFICE 2,523,014

HYDRAULIC MOWER

Herbert L. Gooch, Miami, Fla.

Application July 15, 1947, Serial No. 761,079

2 Claims. (Cl. 56—25.4)

This invention relates to an improved mowing machine, and particularly to a mowing machine and weed cutter wherein the moving cutting elements are actuated by fluid pressure which is generated by a suitable engine or motor carried on the machine.

In accordance with this invention a mowing machine is provided which may be utilized with equal success for the production of a close, uniform cut on a smooth surfaced lawn or for the cutting of high weeds or other forms of vegetation growing on rough and uneven ground.

It is a feature of this invention that a plurality of rotary, disc-like cutting elements are employed which are disposed in a spaced array along a fixed, transversely disposed cutter bar on the machine and cooperate with such cutter bar to effect the cutting of grass or other vegetation. Such rotary cutting disks are driven by fluid pressure turbines and such turbines are in turn supplied with fluid pressure by a pump driven by a suitable prime mover carried on the machine. With such an arrangement, the direct drive connection, which has heretofore characterized machines of this type, has been completely eliminated and in its place a fluid pressure coupling is provided between the prime mover and the rotary cutting elements. Hence, whenever the cutting elements inadvertently strike foreign articles, such as stones, branches, or other forms of trash over which the mower may be directed, the impact of the rotary cutting blades on such foreign article will not subject the driving mechanism to any undue stress or strain.

Another feature of this invention is the unique cooperation of the supporting casing of the fixed cutter bar with the rotary cutting blades in such manner that the blades are substantially completely protected from contact with foreign objects other than vegetation, and particularly, completely protected from inadvertent contact with the ground over which the mower is traversed, regardless of the roughness of such ground.

Still another feature of this invention is the provision of a hydraulically driven mowing machine wherein both the rotary cutting elements and the supporting wheels of the machine are driven by fluid pressure turbines and wherein the pressure supplied to the wheel turbines is controllable independently of the cutting blade turbines so that the ground speed of the machine may be readily adjusted by the operator independently of the speed of the rotary cutting blades.

Accordingly, it is an object of this invention to provide an improved mowing machine, and particularly to provide a mowing machine wherein the various moving elements are hydraulically driven by a fluid pressure derived from a prime mover carried by the machine.

A further object of this invention is to provide an improved mowing machine utilizing rotary cutting blades co-operating with a fixed cutting bar wherein the cutting blades are substantially completely enclosed by frame elements of the machine and hence protected from any inadvertent contact with the ground or objects other than vegetation.

A particular object of this invention is to provide an improved fluid pressure control system for a hydraulically actuated mowing machine wherein both the supporting wheels of the machine and the cutting blades thereof are driven by fluid pressure turbines but the speed of the supporting wheels is controllable by the operator independently of the speed of the rotary cutting blades.

Still another object of this invention is to provide a mowing machine wherein the moving cutting elements are hydraulically coupled to a prime mover carried by the machine so that shocks and stresses upon the prime mover normally attendant upon the cutting blade encountering a foreign object are largely eliminated by virtue of the fluid coupling.

The specific nature of the invention, as well as other objects and advantages thereof, will become apparent to those skilled in the art from the following detailed description of the annexed sheets of drawings which, by way of preferred example only, illustrate one specific embodiment of the invention.

Figure 1:
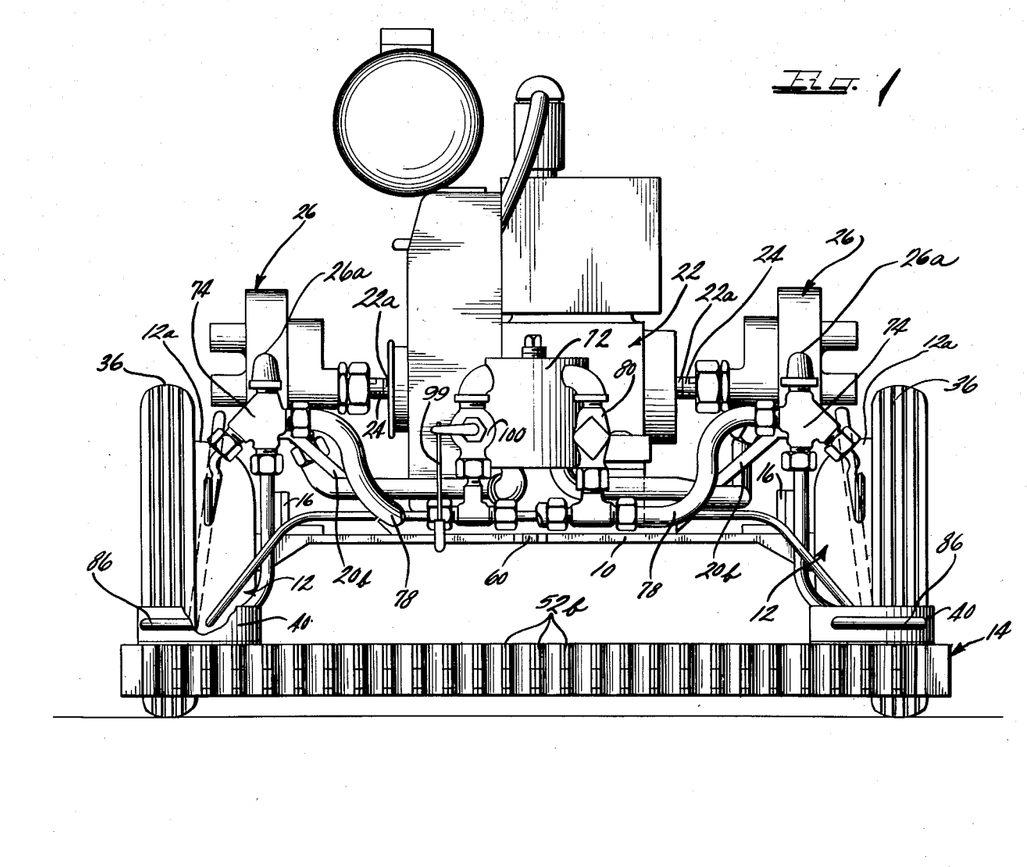
Figure 1 is a front elevational view of a mowing machine embodying this invention with the pivot wheel removed for clarity.
Figures 2, 3:
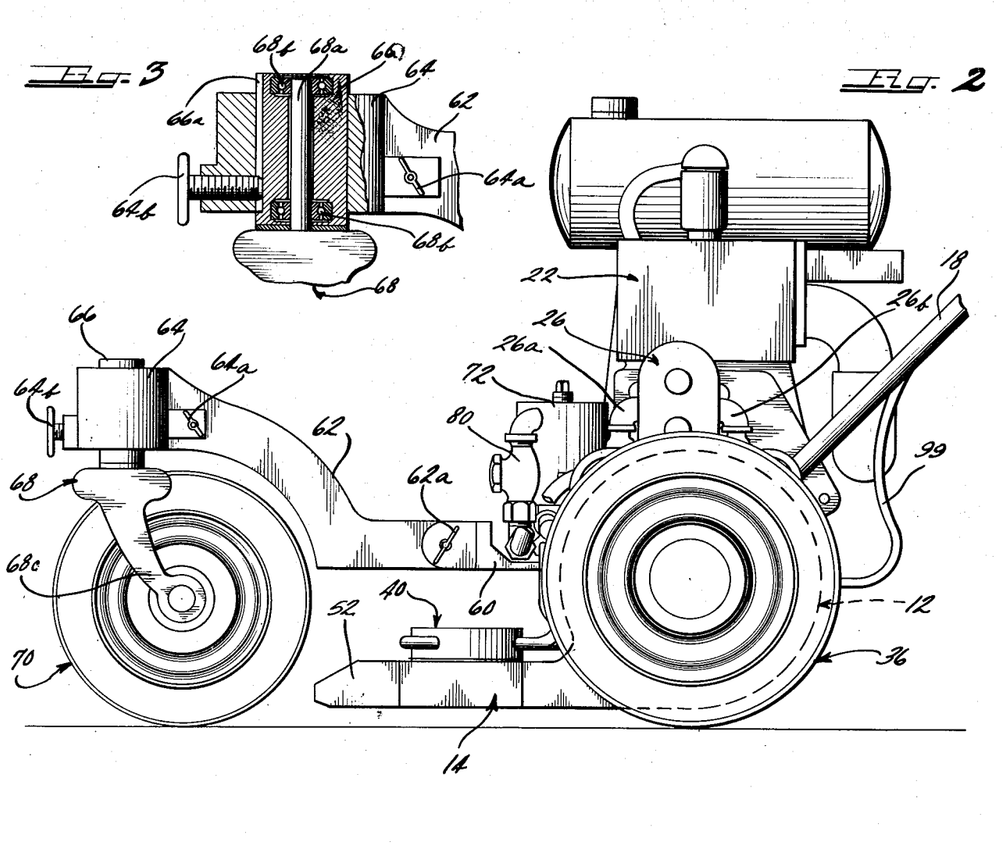
Figure 2 is a side elevational view of the machine shown in Figure 1.
Figure 3 is an enlarged scale, elevational view, partly in section, of the bearing mounting of the pivot wheel of the machine of Figure 1.
Figure 4:
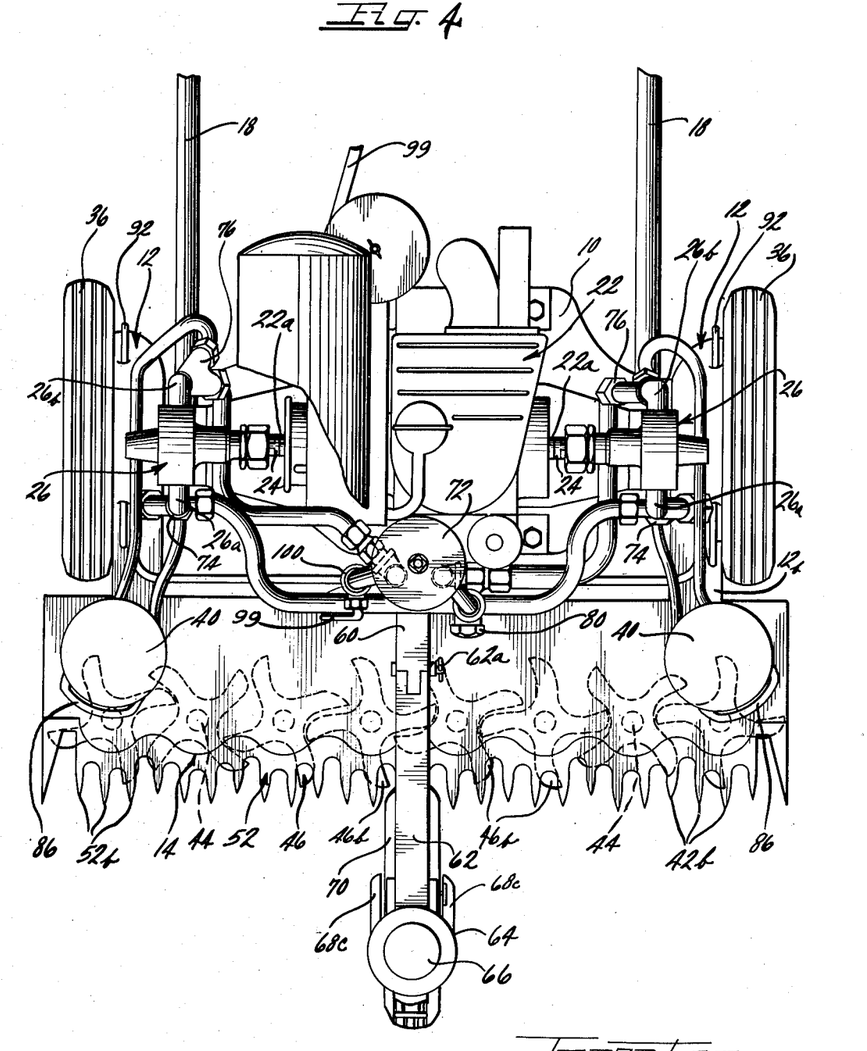
Figure 4 is a top elevational view of the machine of Figure 1.
Figure 5:
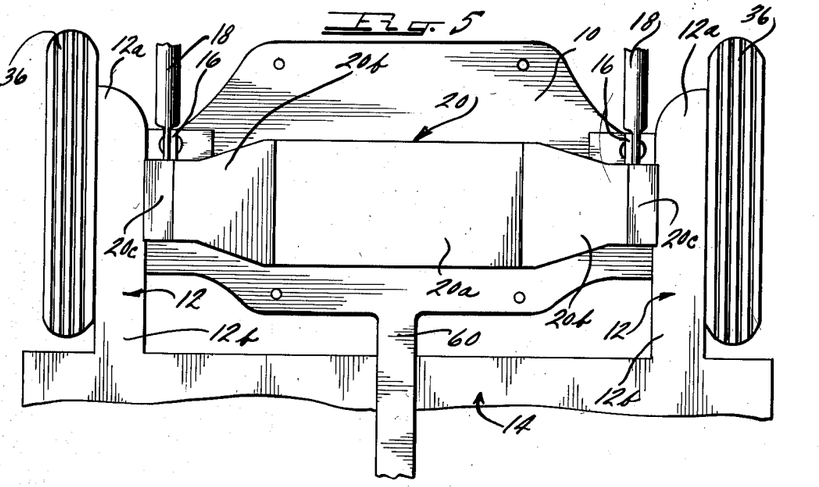
Figure 5 is a view similar to Figure 4, but showing only the frame elements of the machine and with the other mechanism normally supported by the frame eliminated for purposes of clarity.
Figure 6:
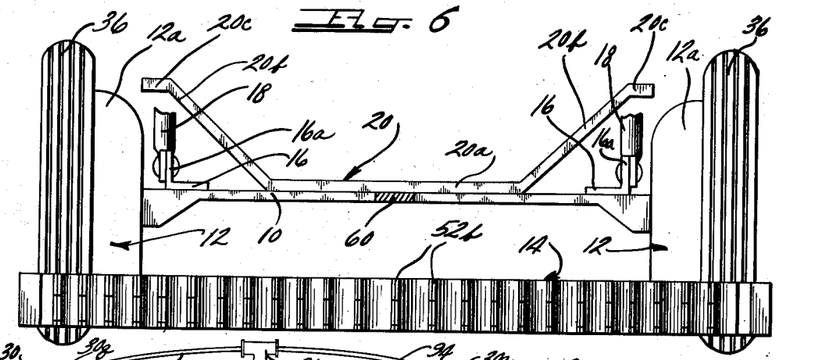
Figure 6 is a front elevational view of Figure 5.

Referring particularly to Figures 5 and 6, it will be seen that the main frame structure of the machine embodying this invention comprises a transverse beam or platform element 10 which is rigidly secured in any conventional fashion between a pair of housing members 12. The housing members 12 are identical, but of mirror image reversed construction and each comprises a generally cup-shaped portion 12a (Figure 7), within which the wheel turbine and wheel bearing elements are mounted, and an integral forward extension 12b which provides support for the transversely extending cutter bar casing 14.

A pair of angle brackets 16 are rigidly secured to transverse beam 10 in spaced relation and the upstanding arms 16a thereof are utilized to pivotally mount the ends of handle frame tubes 18. The handle frame tubes 18 extend upwardly and rearwardly with respect to the machine and are secured at their remote ends to a suitable conventional transverse handle portion (not shown). A pump support bracket 20 is also centrally mounted upon the transverse beam 10 and comprises an integral stamping or casting having a base portion 20a resting centrally on transverse beam 10 and angularly upward by directed arm portions 20b at each end thereof. A pump support platform 20c is formed at the end of each arm 20b.

A suitable prime mover 22, such as any one of several well known forms of gasoline engines, is centrally mounted upon the transverse beam 10. It should be understood that such prime mover forms no part of this invention and, if desired, an electric motor might readily be substituted for the gasoline engine illustrated in the drawings. In any event, the prime mover 22 has a transversely extending, horizontal output shaft 22a projecting therefrom on each side and each projecting end of such shaft is connected by a suitable coupling 24 to the rotary member of a fluid pump 26, each of which is supported upon the end portions 20c of the bracket 20. Here again, the particular construction employed for the fluid pressure pump 26 forms no part of this invention and any conventional pump may be utilized. Each of the pumps has an output port or conduit 26a and an input conduit 26b and the fluid pressure connection to such conduits will be described in more detail later.

Figure 7:
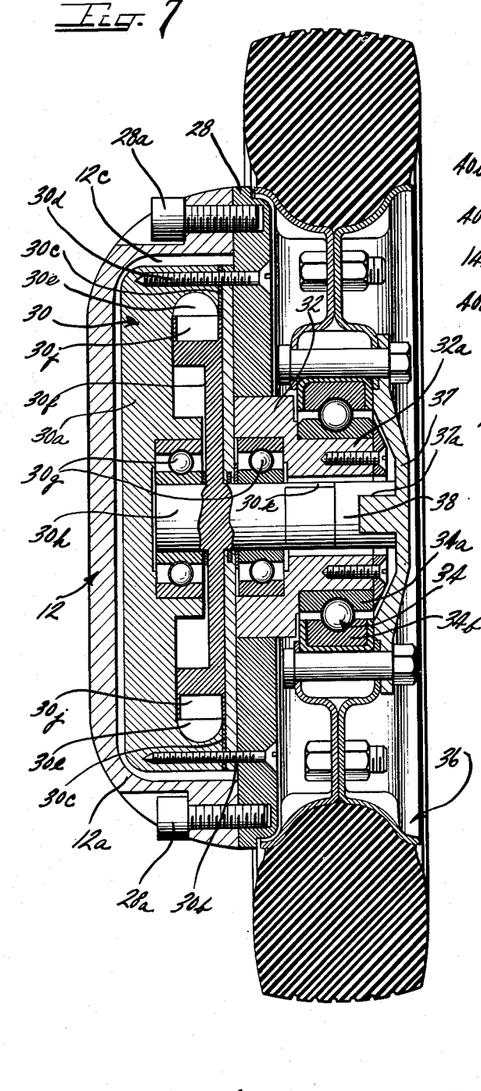
Figure 7 is an enlarged scale, sectional view taken on an axial plane through one of the supporting wheels of the machine.

Referring particularly to Figure 7, it will be seen that each of the cup-shaped housing portions 12a is closed by a wheel supporting plate 28 which is secured thereto by suitable bolts 28a. In the chamber 12c thus defined by housing portion 12a and plate 28, a wheel turbine 30 is mounted. Turbine 30 may conveniently comprise a casing portion 30a and cover 30b which are drawn into fluid sealed relationship with gasket 30c therebetween by suitable bolts 30d which also mount the casing to the plate 28.

A turbine chamber 30e is thus defined and in this chamber a generally disk-like rotor 30f is rotatably mounted by suitable antifriction bearings 30g, which cooperate with rotor shaft 30h. Rotor disk 30f is provided with generally U-shaped recesses or buckets 30j in circumferentially spaced relationship around its periphery and, when fluid pressure is supplied thereto in a manner to be described later, the rotor 30f will be rotated at a substantial speed.

A wheel hub member 32 is pressed or otherwise rigidly secured in a central aperture in wheel supporting plate 28. An axially projecting hub portion 32a of the hub member 32 provides a mounting for stationary ring 34a of an antifriction wheel bearing unit 34. A wheel 36, which may comprise any conventional construction, is secured to the rotary ring element 34b of the bearing unit 34 by clamping bolts 36a. A spider hub 37 is also secured to wheel 36 by the bolts 36a and such hub defines a central axial projection 37a.

A driving connection is established between the rotor shaft 30h of the turbine unit 30 and the hub 37 by a coupling 38 which comprises a generally cylindrical member having a radial slot in one end at right angles to an identical slot in the other end. One such slot fits over the axial projection 37a of the hub 37 while the other slot receives a correspondingly shaped end projection 30k formed on the rotor shaft. Such coupling therefore transmits a rotary motion from the turbine rotor shaft 30h to the wheel 36 even though the two shafts may not be at all times exactly in axial alignment. It will be recognized by those skilled in the art that this condition may occasionally exist at times when the machine is in operation on rough ground. The provision of the coupling 38 therefore permits the turbine units 30 to operate with an absolute minimum of end or side thrust at all times.

As was previously mentioned, the cutter bar casing 14 extends transversely across the full width of the machine and is positioned in front of the wheels 36. Such casing may be conveniently formed by casting and may, if desired, be cast integral with the housing members 12 from which it derives its support.

Cutter bar casing 14 is of generally rectangular, boxlike configuration, defining an interior recess 14a and has an open bottom. At each end of the casing 14, near the rear side thereof, a vertical shaft 40a is journaled in casing 14 by antifriction bearing 14b and projects out of the top face of the cutter bar casing 14 to function as a rotor shaft for a turbine unit 40. As will be seen later, the turbines 40 are employed to drive rotary cutting elements of the mowing machine and hence will be hereinafter referred to as the cutter turbines.

Each of the cutter turbine units 40 is of identical construction comprising a generally cup-shaped housinng member 40b which is supported in inverted relationship upon the top surface of cutter bar casing 14 and the open bottom face thereof covered by a plate 40c. In the sealed chamber thus defined, a turbine rotor 40f is rotatably mounted by being secured to shaft 40a. Each turbine rotor 40f is provided with circumferentially spaced recesses or buckets 40g around its periphery in the same manner as the wheel turbine units 30 heretofore described. The fluid pressure connections to the turbine units 40 will be described later in detail.

That portion of each turbine shaft 40a which projects downwardly into the cutter bar casing 14 has a large driving gear 42 (Figure 9) secured thereto as by key 42a. Immediately in front of each turbine shaft 40a, a spindle 44 is journaled in cutter bar casing 14 in a suitable antifriction bearing 14c. Each spindle 44 has a small gear 45 suitably keyed thereto which meshes with the large gear 42 carried by the turbine shaft 40a. The open bottom face of the recess 14a of the cutter bar 14 is substantially completely closed by a cover plate 47 which is secured to casing 14 by suitable screws 47a. Cover plate 47 is suitably apertured to receive antifriction bearing units 47b and 47c which respectively cooperate with the bottom ends of turbine shaft 40a and spindle 44 to provide adequate bearing support for such shaft members. On the bottom ends of each of the spindles 44 a cutting element 46 is rigidly, yet detachably secured as by screw 46a. Each cutting element is of disk-like configuration and defines a plurality of radially projecting cutting blades 46b.

Figure 10:
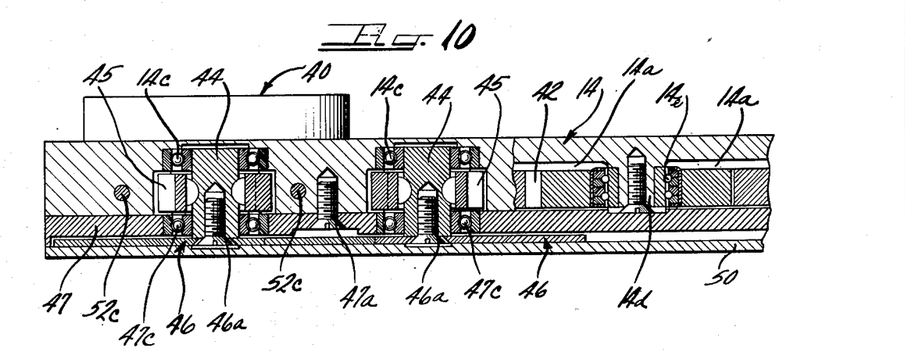
Figure 10 is a multiplane sectional view taken on the line X—X of Figure 8.

Obviously, the number of cutting elements 46 which may be incorporated in any particular mowing machine is purely a function of the transverse dimensions of such machine. In the illustrated embodiment, a total of eight rotary cutting elements is employed. Accordingly, intermediate the turbine driving shaft 40a six vertical depending studs 14d (Figure 10) are formed in cutter bar casing 14 and six additional large gears 42 are journalled thereon by antifriction bearings 14e. All of such gears 42 are intermeshed with each other and with the turbine driven gears 42 which are located at each end of the array. Six additional spindles 44 are also mounted in identical manner to the two end spindles 44 heretofore described and each of these spindles has a small gear 45 keyed thereto and meshed with the adjacent large gear 42. Likewise, a rotary cutting element 46 is detachably secured to each of the additional spindles by screws 47a. The cutting blades 46b of each of the cutting elements 46 are suitably shaped and dimensioned so as to permit such blades to rotate in intermeshing relationship with each other.

Figure 8:
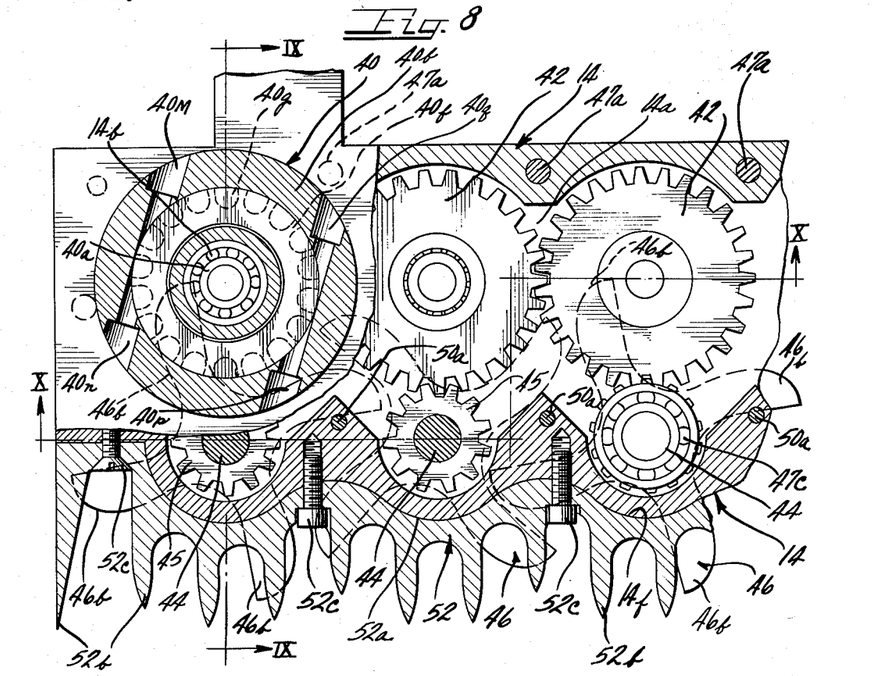
Figure 8 is an enlarged scale, top elevational view, with portions thereof in section, of the cutter bar casing assemblage of the machine.
Figure 9:
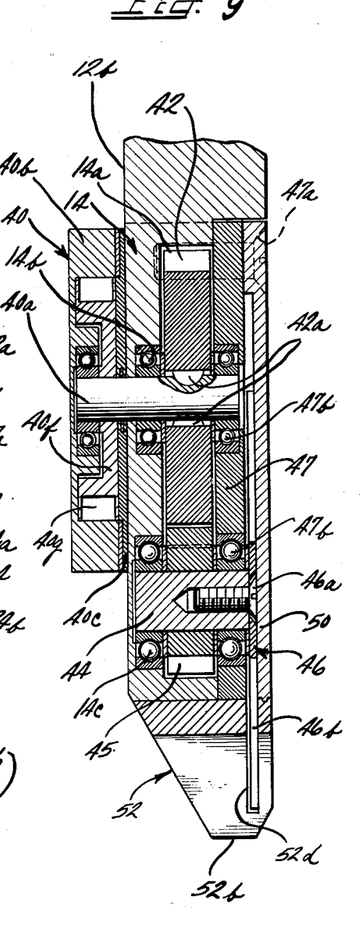
Figure 9 is a sectional view taken on the plane IX—IX of Figure 8.

As best shown in Figures 8 and 9, a portion of each of the cutting blades 46b of the cutting elements 46 projects forwardly beyond the front edge of the cutter bar casing 14. However, the bottom face of the cutting element 46 is completely covered and protected by the provision of a cover plate 50, which is suitably secured to cutter bar casing 14 by screws 50a.

As best shown in Figure 8, the front edge 14f of the cutter bar casing 14 is of serpentine configuration conforming generally to the irregular shape of the recess 14a so as to maintain a minimum wall thickness. A fixed cutter bar 52 is provided having a rear face 52a of corresponding serpentine configuration so as to snugly fit against the front face of cutter bar casing 14. Fixed cutter bar 52 is secured to cutter bar casing 14 by a plurality of screws 52c. Cutter bar 52 is provided with a plurality of transversely spaced, forwardly projecting teeth 52b, each of which is provided with a pointed end. Hence, as the mowing machine is advanced through grass or vegetation, the upstanding vegetation will be directed by the points of the teeth into the recesses defined between the adjacent cutter bar teeth 52b. Note that the ends of teeth 52b define an undulating line conforming to the path of the forwardly projecting portions of the rotary cutting blades 46b.

The cutter bar 52 is provided in addition with a rearwardly opening, horizontal recess 52d. The recess 52d extends forwardly into the cutter bar teeth 52b and is suitably proportioned so as to receive the forwardly projecting portions of the rotary cutting blades 46b of the cutting elements 46.

From the foregoing description, it is apparent that the blades 46b of the cutting elements 46 achieve an unusually effective cutting relationship with respect to the teeth 52b of the fixed cutter bar 52. Any vegetation passing into the recesses between the cutter bar teeth 52b is supported thereby in an upright position and will be readily cut by the rotating blades 46b. Furthermore, even the forwardly projecting portions of the rotating blades 46b are substantially protected from engagement with the ground or other foreign objects lying on the ground such as stones or sticks by virtue of the fact that such blades pass through the recesses 52d in the fixed cutter bar 52. Hence, the only type of foreign objects with which the rotary blades 46b may contact are upstanding, stem-like articles which, however, must be of sufficiently small width to permit them to pass into the recesses between adjacent teeth 52b of the cutter bar 52. Since a relatively close spacing may be employed between such teeth, it is apparent that the described construction prevents any objects of any substantial size from being struck by the rotary cutting blades 46b so as to damage such blades.

While the machine as heretofore described can be supported and operated on the two wheels 36, preferably a third pivot wheel is secured to the machine frame so as to provide a third supporting point longitudinally displaced from the wheels 36. Thus a bracket 60 is suitably rigidly secured to the center portion of transverse frame beam 10 and projects forwardly therefrom, overlying the cutter bar casing 14. Bracket 60 terminates in a bifurcated portion which pivotally mounts the end of a wheel support frame 62. The pivotal position of wheel support frame 62 with respect to bracket 60 may be conveniently adjusted and then clamped in adjusted position by a screw clamp 62a. At the forward end of wheel support frame an apertured journal member 64 is mounted by a screw clamp 64a. A bearing cylinder 66 is slidably mounted in the vertical aperture of the journal 64 and has an external, longitudinally extending slot 66a which is engaged by a set screw type bolt 64b which is radially mounted in the journal member 64. Hence the vertical position of the bearing cylinder 66 may be conveniently adjusted and the cylinder clamped in such adjusted position by tightening of the bolt 64b.

The shank portion 68a of a caster bracket 68 is journaled in the bore of bearing cylinder 66 as by antifriction bearing units 68b. A pivot wheel 70 is suitably journaled in the ends of the bifurcated arms 68c of the caster bracket 68.

From the foregoing description, it is apparent that the adjustable height bearing structure provided for the pivot wheel 70 permits the relative height of the cutter bar casing 14 to be conveniently adjusted with respect to the ground and hence the height of the cut effected by the rotary cutting elements 46 to be conveniently selected. Furthermore, in the event that it is desired to cut weeds, grass or other vegetation lying close to building structures or fences, the pivot wheel support bracket 62 may be freed for pivotal movement with respect to the machine frame by loosening the screw clamp 62a and hence the pivot wheel 70 may be raised upwardly away from the cutter bar frame 14. Hence the cutter bar frame may be brought completely against the building structure or fence and the vegetation cut to within a quarter of an inch of such structure without danger of injury to the rotary cutting element.

Turning now to the hydraulic system by which the supporting wheels 36 and the rotary cutting elements 46 are driven, there is preferably provided on the machine a fluid accumulator or reservoir tank 72. The various connections between the two engine driven pumps 26, the wheel turbines 30, the cutter blade turbines 40, and the fluid accumulator 72 will be more clearly understood by reference to the schematic flow diagram of Figure 11.

Figure 11:
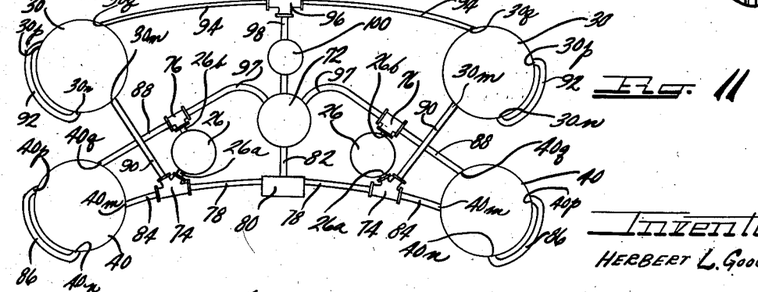
Figure 11 is a schematic flow diagram of the various hydraulic circuits employed in the machine.

As previously mentioned, each of the pumps 26 has an inlet pipe 26a and an outlet pipe 26b connected thereto. A four-way fitting 74 is connected to the outlet pipe 26a of each of the pumps while a three-way fitting 76 is connected to the input pipe 26b of each of the pumps. One branch of each of the fittings 74 is connected as by pipe 78 to a pressure balancing relief valve 80 of conventional construction which bleeds into the accumulator tank 72 through the pipe connection 82. Hence, the output pressures developed by the pumps are maintained substantially equal and are limited below a selected value determined by the pressure balancing relief valve 80.

Another branch of each of the four-way fittings 74 is connected by pipe 84 to an input port 40m provided on one of the cutter blade turbines 40. Such input port directs fluid into the turbine chamber along a substantially tangential path and the fluid thus impinges upon the buckets 40g of the turbine rotor 40f, as best shown in Figure 8. At a circumferentially spaced point from the inlet port, a transfer port 40n is provided which is connected to a secondary inlet port 40p on the other side of the turbine chamber by a cross connection pipe 86. Hence the fluid is permitted to again operate on the turbine rotor 40f but of course at a reduced pressure. The spent fluid is withdrawn from an exhaust port 40q and transmitted back to the pump input fitting 76 by a pipe 88. The fourth branch of the pump output fitting 74 is connected by pipe 90 to the input port 30m of one of the wheel turbines 30. The passage of fluid through such wheel turbines is identical to that previously described in connection with the cutting blade turbines, there being transfer ports 30n, cross connection pipes 92, secondary input ports 30p and exhaust ports 30q identically arranged as the similar elements heretofore described in connection with the cutting blade turbines. A pipe 94 connects the exhaust port of each of the wheel turbines through a fitting 96 to a common return conduit 98.

A manually adjustable throttling valve 100 is inserted in common return conduit 98 between such conduit and the accumulator tank 72. A control linkage 99 is provided for the adjustable throttling valve 100 which leads to a suitable operating handle or knob (not shown) conveniently mounted adjacent the handle of the machine so as to be readily adjustable by the operator. Obviously, operation of the throttling valve 100 varies the rate of flow of fluid through the wheel turbines 30 and hence the speed of the wheels may be conveniently controlled through the linkage 99 independently of the speed of the rotary cutting elements 46.

Lastly, pipes 97 are provided which connect the accumulator tank 72 to the other branch of the three-way fitting 76 provided at the input side of the pump.

The operation of the machine is believed to be entirely clear from the foregoing description. The gasoline engine is preferably adjusted to operate at a substantial constant speed by manipulation of its throttle or of its spark control in conventional fashion. Hence the rotary cutting elements 46 operate at a substantial constant speed and do not require the attention of the operator during the mowing operation. The speed of traverse of the mowing machine over the ground is conveniently controlled by the operator by manipulation of the linkage 99 which controls the adjustable throttling valve 100 and thus varies the speed at which the wheels 36 are driven by wheel turbines 30.

By virtue of the fact that the rotary cutting elements 46 have only a fluid coupling with the prime mover of the machine, it is obvious that when the cutting blades inadvertently strike a hard object, the possibility of damaging such blades or of setting up excessive stresses on the prime mover is substantially eliminated by virtue of the fluid drive herein provided. It is not possible to overload the gasoline engine inasmuch as any excess of pressure developed in the pump is promptly relieved by the pressure balancing valve 78. Furthermore, the fact that the prime mover may be operated at a substantially constant speed obviously permits the design of such prime mover to always operate in its maximum efficiency range. Therefore the fuel consumption of a machine embodying this invention may be substantially reduced over that of existing mowing machines.

It will, of course, be understood that various details of construction may be modified through a wide range without departing from the principles of this invention and it is, therefore, not the purpose to limit the patent granted hereon otherwise than necessitated by the scope of the appended claims.

I claim as my invention:

1. A mowing machine comprising a frame, a pair of supporting wheels journalled on opposite sides of said frame, a fluid pressure turbine drivingly connected to each wheel, a cutter bar fixed to said frame, a plurality of rotatable cutting elements mounted on said cutter bar for rotation about spaced horizontally aligned, vertical axes, means connecting said cutting elements for co-rotation, a turbine drivingly connected to said cutting elements, a motor on said frame, a fluid pump driven by said motor, means for supplying pressured fluid from said pump to each of said turbines, a common return conduit from said wheel turbines to said pump, and an adjustable throttling valve disposed in said return conduit for varying the speed of said wheels.

2. A mowing machine comprising a frame, a pair of supporting wheels journalled on opposite sides of said frame, a fluid pressure turbine drivingly connected to each wheel, a plurality of rotatable cutting elements mounted on said frame in transversely spaced array, means connecting said cutting elements for co-rotation, a turbine drivingly connected to said cutting elements, a motor on said frame, a pair of fluid pumps driven by said motor, a fluid reservoir, pressure balancing means connected between said pumps and discharging into said reservoir, conduit means for supplying pressured fluid from said pump to said turbines, a common return conduit from said wheel turbines to said reservoir, and an adjustable throttling valve connected in said common return conduit for controlling the speed of said wheels independently of the speed of said rotary cutting elements.

HERBERT L. GOOCH.

REFERENCES CITED

The following references are of record in the file of this patent:

UNITED STATES PATENTS

| Number | Name | Date |
| --- | --- | --- |
| 1,397,365 | Cook | Nov. 15, 1921 |
| 1,546,088 | Landon | July 14, 1925 |
| 1,939,851 | Horste | Dec. 19, 1933 |
| 1,958,405 | Anthony et al. | May 15, 1934 |
| 1,992,494 | Lundin | Feb. 26, 1935 |
| 2,411,623 | Jaques | Nov. 26, 1946 |

FOREIGN PATENTS

| Number | Country | Date |
| --- | --- | --- |
| 531,465 | Great Britain | Jan. 6, 1941 |